July 10, 1956  C. D. YOUNG  2,753,737
COMBINATION MANUAL AND AUTOMATIC CONTROL VALVE
Filed May 11, 1953  4 Sheets-Sheet 1
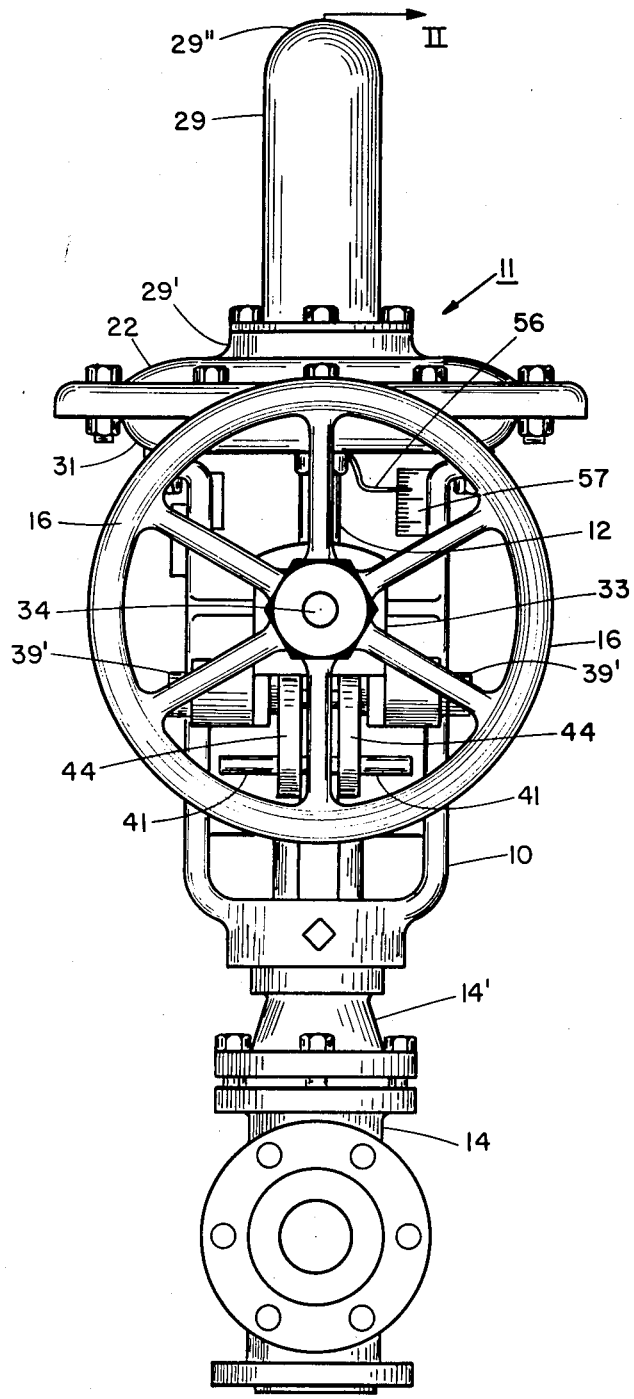
FIG. I
INVENTOR.
CLAUDE D. YOUNG
BY
Curtis, Morris & Safford
ATTORNEYS July 10, 1956
C. D. YOUNG
2,753,737
COMBINATION MANUAL AND AUTOMATIC CONTROL VALVE
Filed May 11, 1953
4 Sheets-Sheet 2
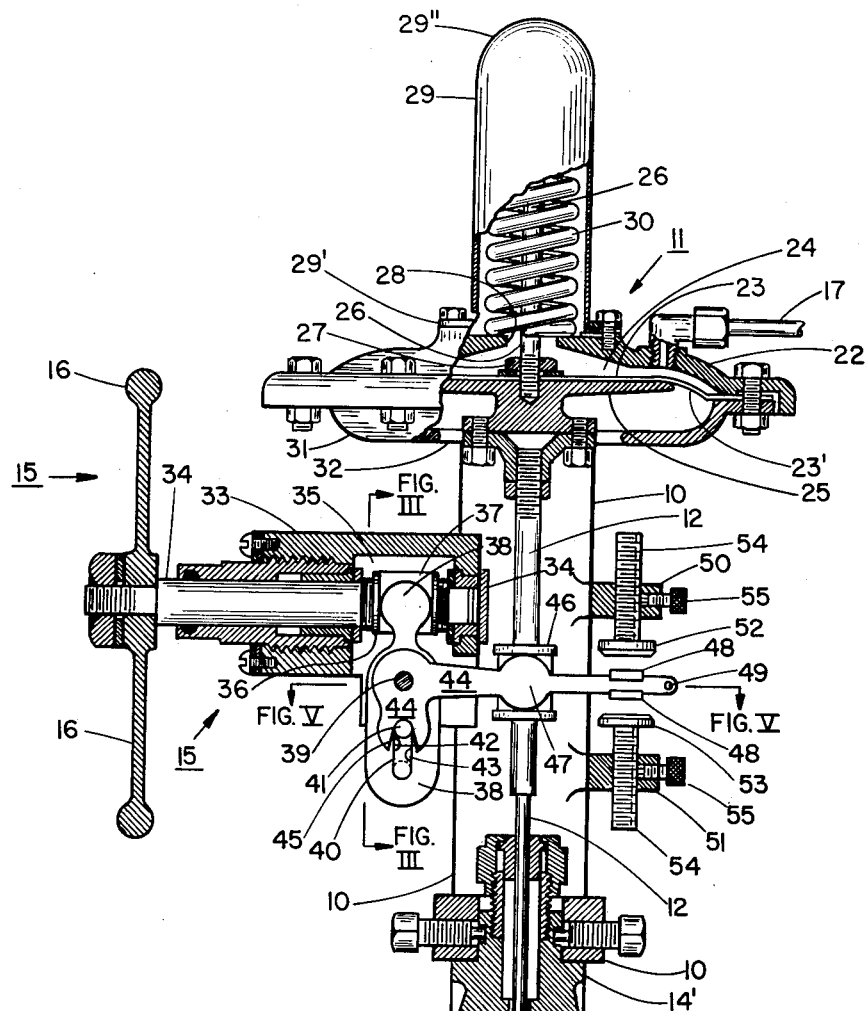
FIG. II
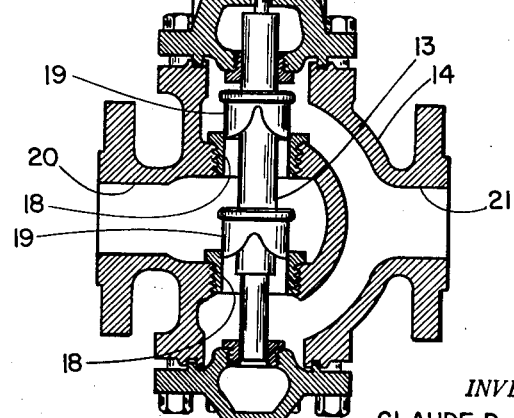
INVENTOR.
CLAUDE D. YOUNG
BY
Curtis, Morris + Safford
ATTORNEYS

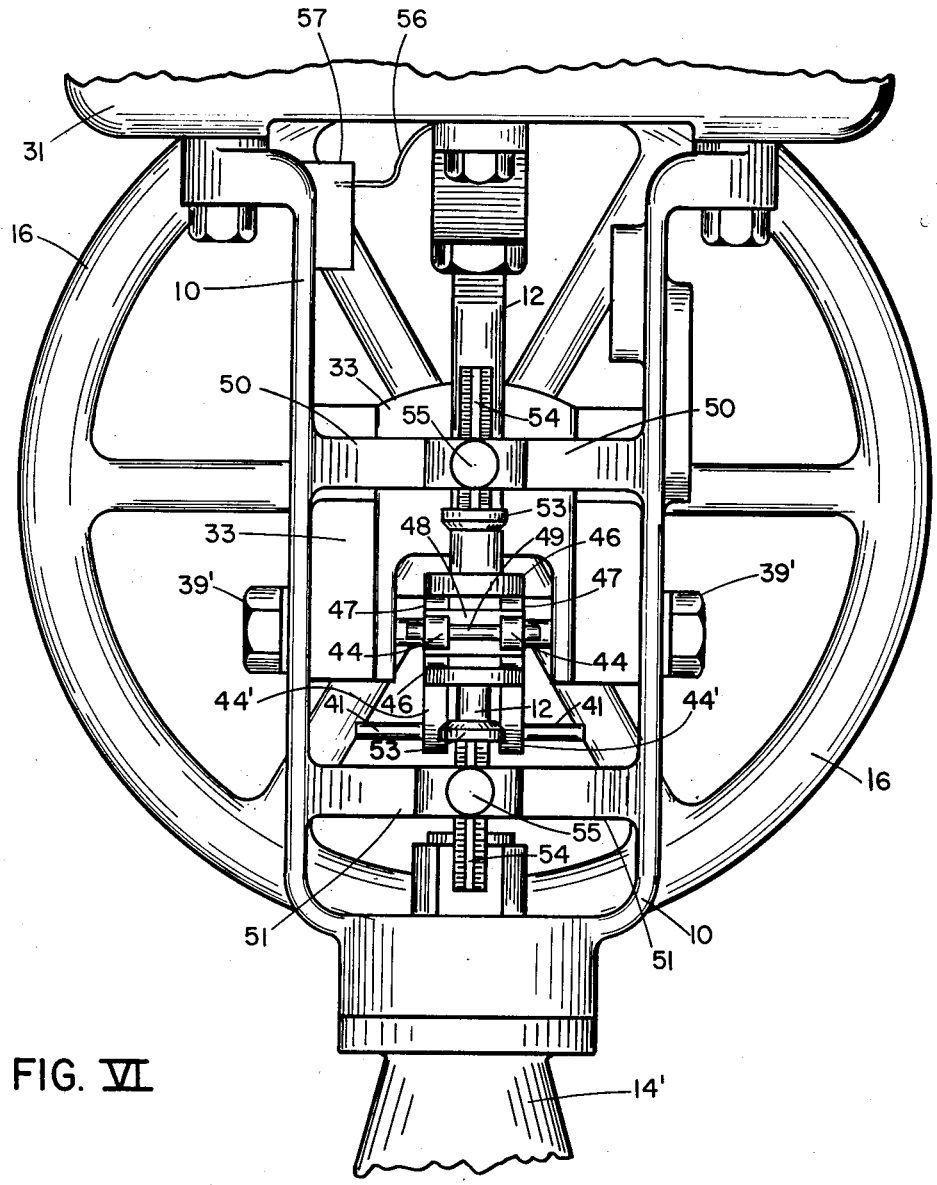
FIG. VI
INVENTOR.
CLAUDE D. YOUNG

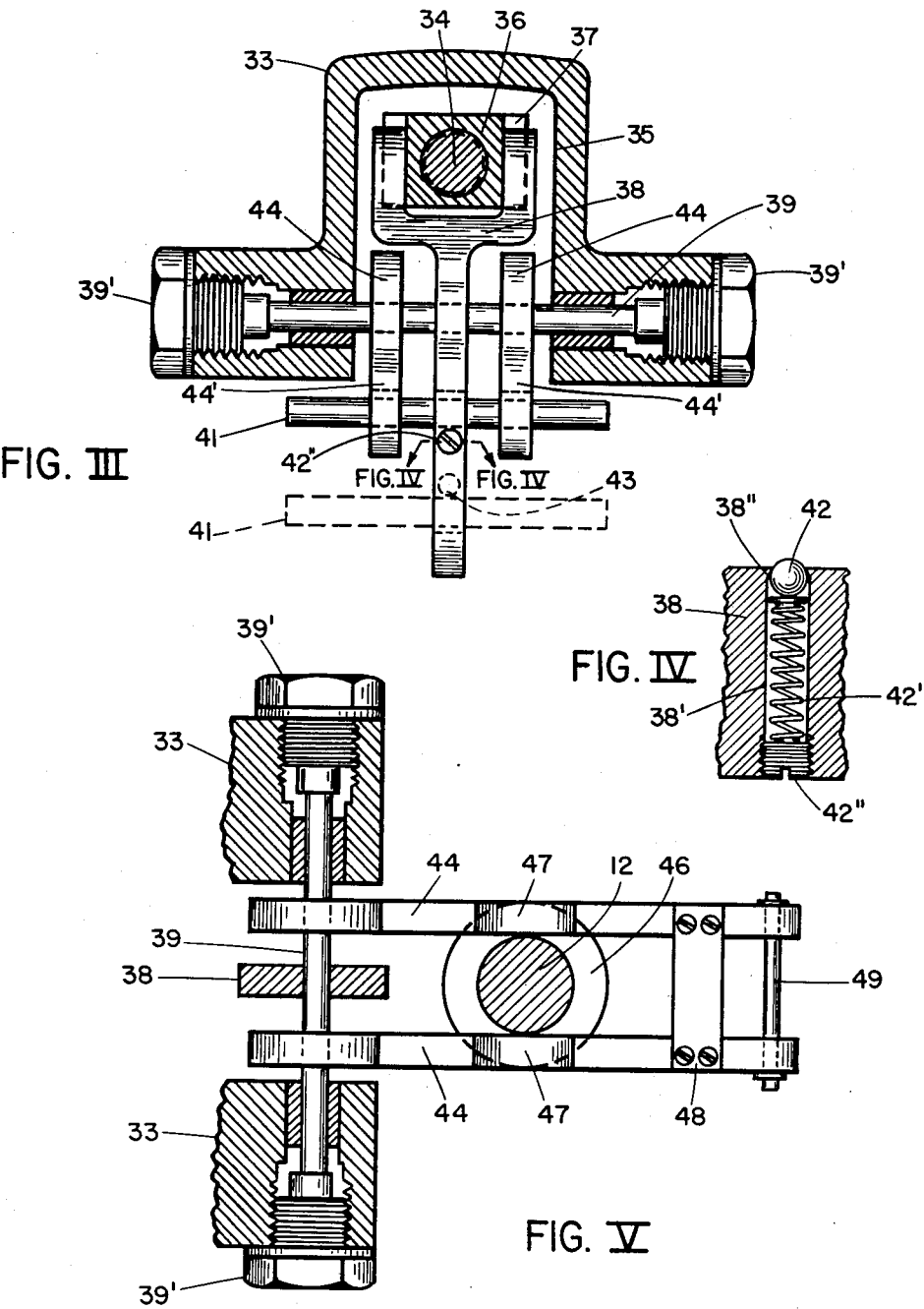

United States Patent Office 2,753,737
Patented July 10, 1956

2,753,737

COMBINATION MANUAL AND AUTOMATIC CONTROL VALVE

Claude D. Young, Foxboro, Mass., assignor to The Foxboro Company, Foxboro, Mass., a corporation of Massachusetts Application May 11, 1953, Serial No. 354,352

6 Claims. (Cl. 74—625)

This invention relates to devices which are provided with automatic control movement, and has particular reference to such devices with manual control means associated therewith.

As an example, this invention is concerned with automatically operated flow control valves and the use of manual control devices therewith.

Automatic flow control valve installations often need an associated manual control as a safety measure for use when the automatic arrangement fails or when manual control is preferable. Some prior installations have used a manual control valve in a by-pass around the automatic control valve. It is preferable, however, to use the same valve for both manual and automatic control. One reason for such preference is that the control valve characteristics remain the same for both manual and automatic control, since the same valve is used. Also it is more convenient to have a single installation, without the necessity of installing a by-pass with a second control valve therein.

There have been, in the past, automatic control valves with manual control devices arranged to operate on the same valves. These operate with a manual control associated with the valve stem. Under automatic control the stem moves up and down, with range limit stops which normally stop the stem only at the upper and lower limits of the stem movement. Manual movement of the stem is accomplished by moving the manual control until it engages one of the range limit stops of the stem. To manually reverse the stem movement the manual control must be moved the entire length of the range of stem movement to engage the other of the range limit stops of the stem. This is very objectionable when it is desirable or necessary to manually control by moving the valve back and forth in different directions.

This invention obviates this difficulty by providing a manual control arrangement in an automatic control valve device, wherein the manual control is instant in either direction when in use.

It is an object of this invention to provide a new and improved combination of an automatic control device and a manual control arrangement.

Other objects and adavntages of this invention will be in part apparent and in part pointed out hereinafter in the specification, and in the accompanying drawings, which illustrate a preferred embodiment of the present invention, and wherein:

Figure I is a front elevation of an automatic valve with manual control, embodying this invention;

Figure II is a central vertical section of the structure of Figure I, taken for the most part as on line II—II of Figure I, and showing both the manual and automatic means for actuating the valve;

Figure III is a vertical section taken as on line III—III of Figure II and showing details of the mechanism for manual actuation of the valve;

Figure IV is a section taken as on line IV—IV of Figure III and showing further details of the manual actuation mechanism;

Figure V is a horizontal section taken as on line V—V of Figure II and showing still further details of the manual valve actuating mechanism; and Figure VI is a rear elevation of the central portion of the structure of Figure I.

The combination manual and automatic flow control valve shown in the accompanying drawings is an illustrative embodiment of this invention.

Referring to Figures I and II, this valve comprises, generally, an open yoke valve housing 10, a pneumatic diaphragm motor 11 mounted on the top of the yoke 10, a valve stem 12 suspended from the motor 11, a valve plunger 13 mounted on the bottom of the stem 12, a connector housing 14' secured to the bottom of the yoke 10, a valve body 14 secured to the connector housing 14' in an arrangement to receive the stem 12 and the plunger 13 and to connect the body 14 to a flow pipe (not shown), and a manual control arrangement 15 with a handwheel 16 as a part thereof.

The valve stem 12 is movable up and down in response to pneumatic pressure variations applied to the valve motor 11 through a pneumatic signal input pipe 17, in response to value changes in a variable condition such as flow, pressure, temperature, etc. This movement of the valve stem 12 results in movement of the valve plunger 13 up and down to open and close ports 18 in the body 14 by means of apertured plunger skirts 19. A flow passage is provided through the valve body 14 by way of flow line pipe connecting openings 20 and 21 and the ports 18.

The motor 11 has an inverted dish-like housing 22 with a circular, flexible diaphragm 23 extending thereacross and secured and sealed peripherally to the housing 22 to form a pressure chamber 24. The diaphragm 23 has an annular, pre-formed fold 23' therein as a means of permitting long stroke movement of the valve stem 12. The pneumatic signal input pipe 17 leads to this chamber. A circular, diaphragm support plate 25 is centrally located with respect to the diaphragm, outside of the chamber 24, and is of such dimension as to support a substantial part of the diaphragm. The valve stem 12 is secured to the diaphragm support plate 25, and the whole diaphragm and valve stem assembly is resiliently suspended through a support pin 26. This pin is inside the pressure chamber 24 and has its lower end extending through the diaphragm 23 and into the support plate 25 in threaded mounting relation therewith. The diaphragm 23 is secured to the support plate 25 at this point by a nut and washer combination 27. The pin 26 extends upwardly through a housing opening 28 into a cylindrical cap 29 which forms an extension of the pressure chamber 24. The cap 29 has a lower, open end 29' which is secured and sealed about the housing opening 28, and an upper, closed end 29''. A coil spring 30 is located in the cap 29 with the support pin 26 extending axially therewithin. The lower end of the spring rests on the housing 22 about the opening 28 therewithin, and the upper end of the spring is secured to the upper end of the support pin 26 in the ordinary and usual way of so forming a resilient spring support.

The diaphragm support plate 25 is enclosed in a dish-like housing 31 which is secured to the main motor housing 22 as a part of the means of securing and sealing the diaphragm 23. The valve housing yoke 10 is secured to the under side of the housing 31, as may be seen in Figure VI. The housing 31 has a central opening 32 through which the valve stem assembly extends downwardly, with the opening smaller than the support plate 25, thus causing the housing 31 to act as a stop to limit downward movement of the support plate 25.

Referring particularly to Figures II, III, and V, the manual control arrangement 15 is mounted in a vertically central location with respect to the valve as a whole. A manual control housing 33 is integral with the uprights of the yoke 10, forming a joining structure therebetween on one side of the valve. The housing 33 has a manual control shaft 34 rotatably journaled therein at right angles to the valve stem 12, and the handwheel 16 is fixed to the outer end of the shaft 34. Adjacent the inner end of the shaft 34 the housing 33 is recessed as at 35 to receive connecting mechanism for operatively joining the manual control shaft 34 with the valve stem 12. Within the housing recess 35, the shaft 34 is threaded, with a traveling block 36 mounted thereon for movement therealong as the shaft 34 is rotated by turning the handwheel 16. The threaded portion of the shaft 34 is oversize with respect to the shaft, to prevent axial movement thereof. The block 36 has vertical channels 37 formed in opposite sides thereof, and a yoke 38 straddles the block 36 from below, with the legs of the yoke in the channels 37. The yoke 38 is in the form of a lever, pivotally mounted on a shaft 39 which is journaled on a fixed axis in the control housing 33, horizontally transverse with respect to the shaft 34. Figures III and V in particular show end bolts 39' mounted in the housing 33 for axially locating the pivot shaft 39.

Thus the yoke 38 prevents rotation of the traveling block 36 on the shaft 34, and rotation of the handwheel 16 causes the block 36 to move along the shaft 34. In consequence the yoke lever 38 is pivoted about the pivot shaft 39. The legs of the yoke 38 are held in free fit relation between the side walls of the block channels 37, and are rounded in a plane parallel to the axis of the manual control shaft 34. Thus the yoke lever pivots smoothly about its pivot shaft 39 as the block 36 moves along the shaft 34.

The yoke lever 38 extends a substantial distance downwardly beyond the pivot shaft 39 with relatively wide, flat sides which are parallel with the manual control shaft 34. This lower portion of the yoke lever has a vertical, closed ended slot 40 therein, through the lever in a direction transversely of the manual control shaft 34 and extending generally radially with respect to the pivot shaft 39. A movable cross bar 41 extends through the slot 40, and is retained therein in either of two positions along the slot, as determined by spring biased retaining balls 42 and 43. Figure IV shows the mounting of the retaining ball 42, which is duplicated in the mounting of the retaining ball 43. The lever 38 has an opening 38' therein with a constricted end 38". The ball 42 is contained in the opening 38' and is pressed against the constriction 38" by a coil spring 42', with the spring retained in the opening by a cap 42". The ball 42 thus is held in the opening 38', but partially out of the opening for resilient engagement with the cross bar 41.

Also pivotally mounted on the pivot shaft 39 is a pair of valve stem levers 44, one on each side of the yoke lever 38. The main body portions of the levers 44 extend past the valve stem 12 for operative connection therewith, as will be shown hereinafter. The valve stem levers 44 each have, also, short right angled downward extensions 44' from the pivot shaft 39, with a downwardly facing open ended slot 45 in each such extension, alignable with the yoke lever slot 40 by movement of the yoke lever or the valve stem levers about the pivot shaft 39. When the slots 40 and 45 are thus aligned, the cross bar 41 may be moved upwards in the yoke lever slot 40 to register with the valve stem slots 45 as a means of operatively connecting the yoke lever and the valve stem levers. The bottom, open ends of the valve stem lever slots 45 are flared for easy access thereto by the cross bar 41.

The retaining ball 42 holds the cross bar 41 at the top of the yoke lever slot 40 as it joins the levers 38 and 44, and the retaining ball 43 holds the cross bar 41 at the bottom of the yoke lever slot when adjustment of the cross bar downward has removed it from the valve stem slots 45 as a means of operatively disconnecting the levers 38 and 44.

With reference to Figure V, the valve stem levers 44 are parallel, and they straddle the valve stem 12. At this point a spool sleeve 46 is fixed on the valve stem, and the valve stem levers are each provided with a vertically disposed rounded portion 47 which lies close to the valve stem and is vertically operatively connected with the valve stem by the top and bottom shoulders of the spool sleeve 46. Beyond the valve stem 12, the levers 44 are connected by joining plates 48 and a joining bar 49.

Referring to Figures I and VI, on the side of the valve opposite the handwheel 16, the uprights of the valve yoke 10 are horizontally joined by vertically spaced cross members 50 and 51. These members are located respectively above and below the valve stem levers 44. The cross member 50 has a range limit stop bolt 52 therein with its head down for adjustable engagement with the upper of the valve stem lever joining plates 48. Similarly, the cross member 51 has a range limit stop bolt 53 therein with its head up for adjustable engagement with the lower of the valve stem lever joining plates 48. Each of the bolts 52 and 53 has a lengthwise slot 54 therein for receiving a set screw 55 to hold the bolts in adjusted position.

The position of the valve stem 12 is indicated by a pointer 56 which is secured to the valve stem assembly for movement therewith. The valve housing 10 has an indicia plate 57 secured thereto for association with the pointer 56. The plate 57 may be calibrated in any convenient units. An example is a calibration in pneumatic pressure as applied to the valve motor 11. Such pressure, in common practice, may vary from three to fifteen pounds, as the output of a control instrument (not shown). Thus at three pounds pressure in the valve motor 11, the valve is fully open, with the valve stem at its top limit and the indicator pointer 56 at the top of the indicia plate 57. At nine pounds, the valve is half open and the pointer 56 is midway along the indicia plate. At fifteen pounds, the valve is fully closed, and the pointer 56 is at the lower end of the indicia plate 57.

When the manual arrangement is in operation, the position of the valve stem 12 is related to the rotary position of the handwheel 16, and is indicated by the pointer 56 on the indicia plate 57 in terms of the pressure which would be required in the valve motor 11 to duplicate the valve stem position.

In the operation of this device, pneumatic signals applied to the pneumatic motor 11 cause the valve stem 12 to move up and down in an automatic actuation thereof. Increased pressure pushes the valve stem down and decreased pressure allows the spring 30 to pull the valve stem up.

This movement of the valve stem produces movement of the valve stem levers 44 about their pivot shaft 39. Since the valve stem levers are held at one location on the valve stem by the valve stem sleeve 46, any movement of the valve stem is accompanied by pivotal movement of the valve stem levers 44 about their pivot shaft. The range of valve stem movement is established by the stop bolts 54, since engagement of either of the lever joining plates 48 with one of these bolts will prevent further movement of the valve stem in the direction of such engagement.

When the yoke lever 38 and the valve stem levers 44 are operatively connected by the cross bar 41, the valve stem 12 is not movable by the pneumatic motor. Such movement would require that the entire manual movement arrangement be moved and under the conditions of leverage of this arrangement the yoke lever 38 as applied to the traveling block 37 will not rotate the manual control shaft 34.

When the yoke and valve stem levers are operatively disconnected by moving the cross bar 41 down, the valve stem 12 is readily movable by the pneumatic motor 11, and the valve stem levers 44 travel with the stem by moving about their pivot shaft 39. Also, the yoke lever 38 pivots freely as the handwheel 16 is turned, without affecting the valve stem movement.

When shifting from automatic to manual control, the handwheel 16 is rotated until the yoke lever slot 40 is aligned with the valve stem lever slots 45, and the cross bar 41 is then snapped up into place. When shifting from manual to automatic control, pressure is introduced into the valve motor 11 to a value indicated on the indicia plate 57 as representing the manual position of the stem 12. This may be accomplished by adjusting the output pressure of a control instrument (not shown) to the pressure indicated on the indicia plate 57. With this pressure in the motor 11 the cross bar 41 is relieved of lateral pressure from the valve stem levers 44 and is free to be snapped down in the yoke lever slot 40 to disconnect the yoke lever 38 from the valve stem levers 44.

This invention, therefore, provides a new and improved combination of an automatic control device and a manual control arrangement.

As many embodiments may be made of the above invention, and as many changes may be made in the embodiments above described without departing from the spirit and scope of the invention as described herein and shown in the accompanying drawings, it is to be understood that all matter hereinbefore set forth or shown in the accompanying drawings is to be interpreted as illustrative only and not in a limiting sense.

I claim:

1. In a control device, a movable element, a first actuating arrangement for automatically moving said element in response to changes in a variable condition, a second actuating arrangement for moving said element, said second arrangement comprising a control system for such operative relation with said element as to prevent movement of said element in any direction by said first actuating arrangement alone whenever said system as a unit is operatively connected to said element and in any position of said system when so connected, said system having a member connected to said element for continuous movement therewith, during all operative movement of said element and actuating arrangement selecting means for fully disconnecting at least a part of said system from said element to remove said opposition of said system to said automatic movement of said element in any position of said element and to render said system inoperable as a unit with respect to producing any movement of said element.

2. In a control valve, a movable valve stem, a first actuating arrangement for automatically moving said stem in response to changes in a variable condition, a second actuating arrangement for moving said stem, said second arrangement comprising a control system for such operative relation with said stem as to prevent movement of said stem in any direction by said first actuating arrangement alone whenever said system as a unit is operatively connected to said stem and in any position of said system when so connected, said system having a member connected to said stem for continuous movement therewith, during all operative movement of said stem and actuating arrangement selecting means for fully disconnecting at least a part of said system from said stem to remove said opposition of said system to said automatic movement of said stem in any position of said stem and to render said system inoperable as a unit with respect to producing any movement of said stem.

3. In a control valve, a movable valve stem, a first actuating arrangement for automatically moving said stem in response to changes in a variable condition, a second actuating arrangement for moving said stem, said second arrangement comprising a screw and lever system for such operative relation with said stem as to prevent movement of said stem in any direction by said first actuating arrangement alone, said lever system having a member operatively connected to said stem for movement therewith, and actuating arrangement selecting means for disconnecting at least a part of said screw and lever system from said stem to remove said opposition of said system to said automatic movement of said stem and to render said system inoperable as a unit with respect to producing movement of said stem.

4. In a control valve, a movable valve stem, a first actuating means for automatically moving said stem in response to changes in a variable condition, and a second actuating means for manually moving said stem, said manual means including a fixed pivot, a first lever mounted on said pivot and having a portion in continuous operative engagement with a manually movable member, a second lever also mounted on said fixed pivot and having a portion in continuous operative engagement with said stem, and a pin and slot arrangement for detachably connecting said levers.

5. In a control valve, a movable valve stem, a first actuating means for moving said stem under power, a second actuating means for manually moving said stem either in the direction of said power movement or in the direction opposite thereto, said manual means comprising a lever system for such operative relation with said stem as to prevent said power movement and to immediately move said stem in one or the other of said directions upon any appreciable movement through said system as a whole, said system having portions thereof detachably separable to remove said opposition of said system to said power movement and to render said system as a whole inoperable with respect to moving said valve stem, and an adjustable stop unit for limiting the movement of said stem, said unit comprising a threaded bolt having a longitudinal slot therein and a transverse lock pin for location in said slot to hold said bolt in its adjusted position.

6. In a pneumatic control valve, a movable valve stem, a pneumatic motor connected to said stem for producing movement therein under power, actuating means for manually moving said stem either in the direction of said power movement or in the direction opposite thereto, said means for manually moving said stem comprising a fixed pivot, a first lever mounted on said pivot and having a portion in continuous operative engagement with said stem, a second lever also mounted on said fixed pivot and having a portion in continuous operative engagement with a portion of said manual movement means, a pin and slot arrangement for detachably connecting said levers, and an adjustable stop unit for limiting the movement of said stem by engagement with said first lever and comprising a threaded bolt having a longitudinal slot therein and a transverse lock pin for location in said slot to hold said bolt in its position of adjustment.

References Cited in the file of this patent

UNITED STATES PATENTS

| Number | Name | Date |
|---|---|---|
| 1,747,594 | Panish | Feb. 18, 1930 |
| 1,966,209 | Miller | July 10, 1934 |
| 2,584,847 | Dahl | Feb. 5, 1952 |